(12) United States Patent
Sakata (10) Patent No.: US 11,008,986 B2
(45) Date of Patent: May 18, 2021

(54) RECTIFICATION STRUCTURAL BODY

(71) Applicant: TIGERS POLYMER CORPORATION, Toyonaka (JP)

(72) Inventor: Shunsuke Sakata, Kobe (JP)

(73) Assignee: TIGERS POLYMER CORPORATION, Osaka (JP)

( * ) Notice: Subject to any disclaimer, the term of this patent is extended or adjusted under 35 U.S.C. 154(b) by 0 days.

(21) Appl. No.: 16/806,360

(22) Filed: Mar. 2, 2020

(65) Prior Publication Data

US 2020/0370519 A1 Nov. 26, 2020

(30) Foreign Application Priority Data

May 22, 2019 (JP) .............................. JP2019-095649

(51) Int. Cl.
*F01L 13/02* (2006.01)
*F02M 35/10* (2006.01)

(52) U.S. Cl.
CPC . *F02M 35/10262* (2013.01); *F02M 35/10111* (2013.01); *F02M 35/10124* (2013.01); *F02M 35/10386* (2013.01)

(58) Field of Classification Search
CPC ............... F02M 35/00; F02M 35/1216; F02M 35/10262
USPC .......................... 123/41.04, 41.11; 415/182.1
See application file for complete search history.

(56) References Cited

U.S. PATENT DOCUMENTS

| | | | | |
|---|---|---|---|---|
| 3,075,743 A | * | 1/1963 | Sheets | F01D 5/146 415/220 |
| 4,318,669 A | * | 3/1982 | Wennerstrom | F01D 9/02 415/119 |
| 5,193,735 A | * | 3/1993 | Knight | B23K 1/008 219/388 |
| 2020/0158059 A1 | * | 5/2020 | Sakata | F02M 35/1261 |
| 2020/0292173 A1 | * | 9/2020 | Viano | F01D 11/08 |
| 2020/0331263 A1 | * | 10/2020 | Benton | B41J 2/14 |

FOREIGN PATENT DOCUMENTS

| | | |
|---|---|---|
| JP | 2014-040779 A | 3/2014 |
| JP | 2015-108336 A | 6/2015 |

* cited by examiner

*Primary Examiner* — John Kwon
(74) *Attorney, Agent, or Firm* — Pearne & Gordon LLP (57) ABSTRACT

A rectification structural body includes a pipe line configured such that air flows from an air cleaner to an airflow sensor. The pipe line has a portion bent in an arc shape. In the pipe line, an air guide plate dividing an internal space of the pipe line into an inner portion and an outer portion of the arc is provided substantially parallel with the center line of the pipe line. The air guide plate includes two ribs. The two ribs are each in an arc shape. The two ribs stand, inside the pipe line, facing each other to extend toward each other. End edges of the two ribs are separated from each other in a rib standing direction by 0.5 to 5 mm at least on an airflow sensor side of the pipe line.

10 Claims, 11 Drawing Sheets

TYPICAL TECHNIQUE

TYPICAL TECHNIQUE

SECT X-X

RECTIFICATION STRUCTURAL BODY

CROSS-REFERENCE TO RELATED APPLICATION

This application claims priority from Japanese Patent Application No. 2019-095649 filed with the Japan Patent Office on May 22, 2019, the entire content of which is hereby incorporated.

BACKGROUND

1. Technical Field

The present disclosure relates to a rectification structural body.

2. Related Art

An internal combustion engine is used for various use applications such as an automobile, a motorcycle, and a power generation device. Air supplied to the internal combustion engine is filtered by an air cleaner provided in an intake system. In this manner, clean air is supplied to the internal combustion engine. In recent years, an airflow sensor (an air flowmeter) has been provided in the intake system of the internal combustion engine. The airflow sensor measures the amount of air sucked into the internal combustion engine. A fuel supply is controlled such that fuel corresponding to the measured air amount is suitably supplied. Normally, the airflow sensor is provided in a flow path downstream of the air cleaner.

In order to enhance the measurement accuracy of the airflow sensor, a rectification structure is, in some cases, arranged between the airflow sensor and the air cleaner.

For example, in a rectification structure disclosed in JP-A-2015-108336, a gradually-changing portion configured such that a flow path sectional area gradually decreases is provided at a branching portion of a pipe body branching from an air cleaner to an airflow sensor. By such a rectification structure, air is rectified in an upstream side of the airflow sensor.

Moreover, in a rectification structure disclosed in JP-A-2014-040779, a curved air guide plate configured to guide air to a duct provided with an airflow sensor is used. The curvature of the curved air guide plate decreases toward a downstream side. By such a rectification structure, flow rate measurement accuracy is improved.

SUMMARY

A rectification structural body provided between an air cleaner and an airflow sensor in an intake system of an internal combustion engine includes a pipe line configured such that air flows from the air cleaner to the airflow sensor. The pipe line includes a portion bent in an arc shape. In the pipe line, an air guide plate dividing an internal space of the pipe line into an inner portion and an outer portion of the arc is provided substantially parallel with a center line of the pipe line. The air guide plate includes two ribs. The two ribs are each in an arc shape. The two ribs stand, inside the pipe line, facing each other to extend toward each other. End edges of the two ribs are separated from each other in a rib standing direction by 0.5 to 5 mm at least on an airflow sensor side of the pipe line.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When the curved air guide plate is utilized as in the rectification structure of JP-A-2014-040779, an air flow is easily efficiently rectified. However, it has been found that even when a structure in which such an air guide plate is provided in a flow path is employed, the output of the airflow sensor may be less stabilized and it may be difficult to achieve sensing with high accuracy.

For example, when the output of the airflow sensor is not stabilized and responsiveness of sensing performance is poor, it is difficult to achieve quick control upon control of an internal combustion engine. For this reason, degradation of the output power and fuel efficiency of the internal combustion engine is easily caused.

Moreover, the output of the airflow sensor is preferably stabilized in a wide flow rate range. In a case where the output is stabilized in a low flow rate range, but becomes unstable in a high flow rate range, it is difficult to properly control the internal combustion engine.

One object of the present disclosure is to provide a rectification structural body configured so that sensing performance can be enhanced by stabilization of the output of an airflow sensor across a wide flow rate range.

As a result of intensive study, the inventor(s) has found that the output of the airflow sensor easily becomes unstable due to a great flow velocity difference between the inside and outside of the curved air guide plate. Specifically, the inventor(s) has found that the flow velocity difference between the inside and outside of the air guide plate increases as the flow rate increases and the output of the airflow sensor easily becomes unstable.

The inventor(s) has further conducted study on a rectification structure provided upstream of the airflow sensor. As a result, the inventor(s) has found that the output of the airflow sensor can be stabilized across a wide flow rate range by a specific form of clearance provided at the air guide plate arranged in the pipe line, and has arrived at the technique of the present disclosure.

A rectification structural body according to one aspect of the present disclosure includes a pipe line configured such that air flows from the air cleaner to the airflow sensor, wherein the pipe line includes a portion bent in an arc shape, in the pipe line, an air guide plate dividing an internal space of the pipe line into an inner portion and an outer portion of the arc is provided substantially parallel with a center line of the pipe line, the air guide plate includes two ribs, the two ribs are each in an arc shape, the two ribs stand, inside the pipe line, facing each other extend toward each other, and end edges of the two ribs are separated from each other in a rib standing direction by 0.5 to 5 mm at least on an airflow sensor side of the pipe line (a first aspect).

The rectification structural body according to the first aspect is preferably configured such that two ribs are substantially provided in a single continuous curved surface (a second aspect).

Moreover, the rectification structural body according to the first or second aspect is preferably configured such that the end edges of two ribs are separated from each other across the entirety of the ribs along the center line of the pipe line (a third aspect).

Further, the rectification structural body according to any one of the first to third aspects is preferably configured such that a spot at which the end edges of two ribs are separated from each other is positioned at a substantially center portion in the section of the pipe line perpendicular to the center line of the pipe line (a fourth aspect).

In addition, the rectification structural body according to the third aspect is preferably configured such that the pipe line includes a first case and a second case integrated with each other, one of two ribs stands in a substantially arc shape in the first case, and the other rib stands in a substantially arc shape in the second case (a fifth aspect).

According to the rectification structural body of the first aspect, the output of the airflow sensor is stabilized across a wide flow rate range. Thus, sensing performance is enhanced.

Further, according to the rectification structural body of the second or fourth aspect, the output of the airflow sensor is more stabilized. Moreover, according to the rectification structural body of the third or fifth aspect, a rectification structural body with a high rectification effect is easily efficiently manufactured.

Hereinafter, embodiments of the present disclosure will be described with reference to the drawings, a rectification structural body used for an intake system configured to supply air to an internal combustion engine of an automobile being taken as an example. The technique of the present disclosure is not limited to the individual embodiments described below, and can be implemented as changed forms of another embodiment. For example, a use target for the internal combustion engine is not limited to the automobile, and may be a motorcycle, a power generation facility, a power facility, and the like.

Figure 1:
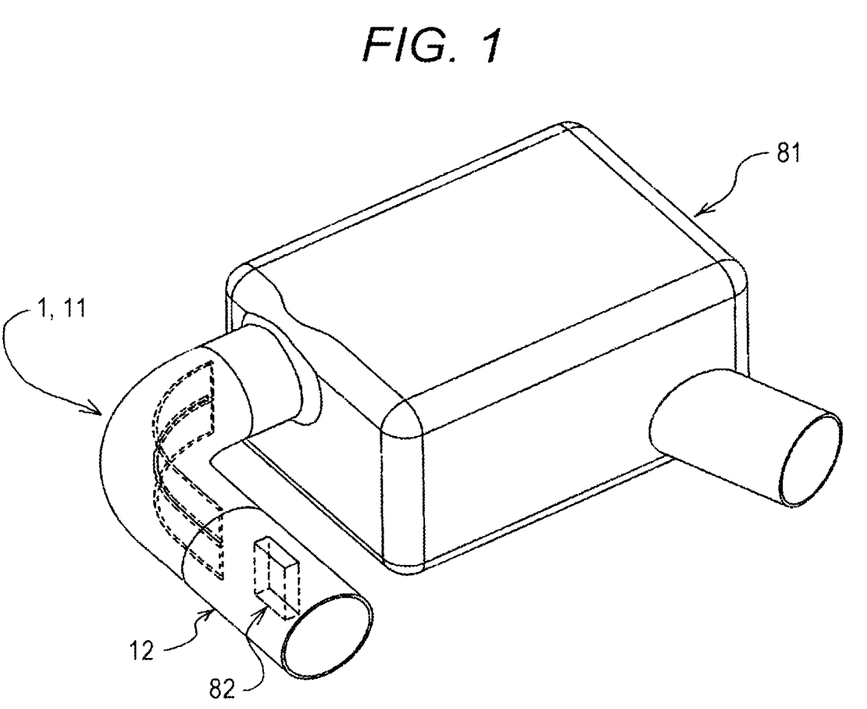
FIG. 1 is a perspective view of part of an intake system of an internal combustion engine incorporating a rectification structural body of a first embodiment.

FIG. 1 illustrates part of an intake system of an internal combustion engine incorporating a rectification structural body 1 of a first embodiment. FIG. 1 mainly illustrates only a portion from an air cleaner 81 to an airflow sensor 82, and does not show other portions. Note that the airflow sensor 82 is normally provided in the form of protruding inward of an air duct 12. FIG. 1 illustrates the rectangular parallelepiped airflow sensor 82 in a see-through state. In the intake system of the internal combustion engine, the rectification structural body 1 is provided between the air cleaner 81 and the airflow sensor 82.

Air is sucked through an intake duct (not shown) connected to an upstream side of the air cleaner 81. The sucked air is filtered by a filter medium in the air cleaner 81, and by way of the rectification structural body 1, passes through the air duct 12 provided with the airflow sensor 82. Further, the air is supplied to the internal combustion engine through a throttle body (not shown) and an intake manifold (not shown).

Figure 2:
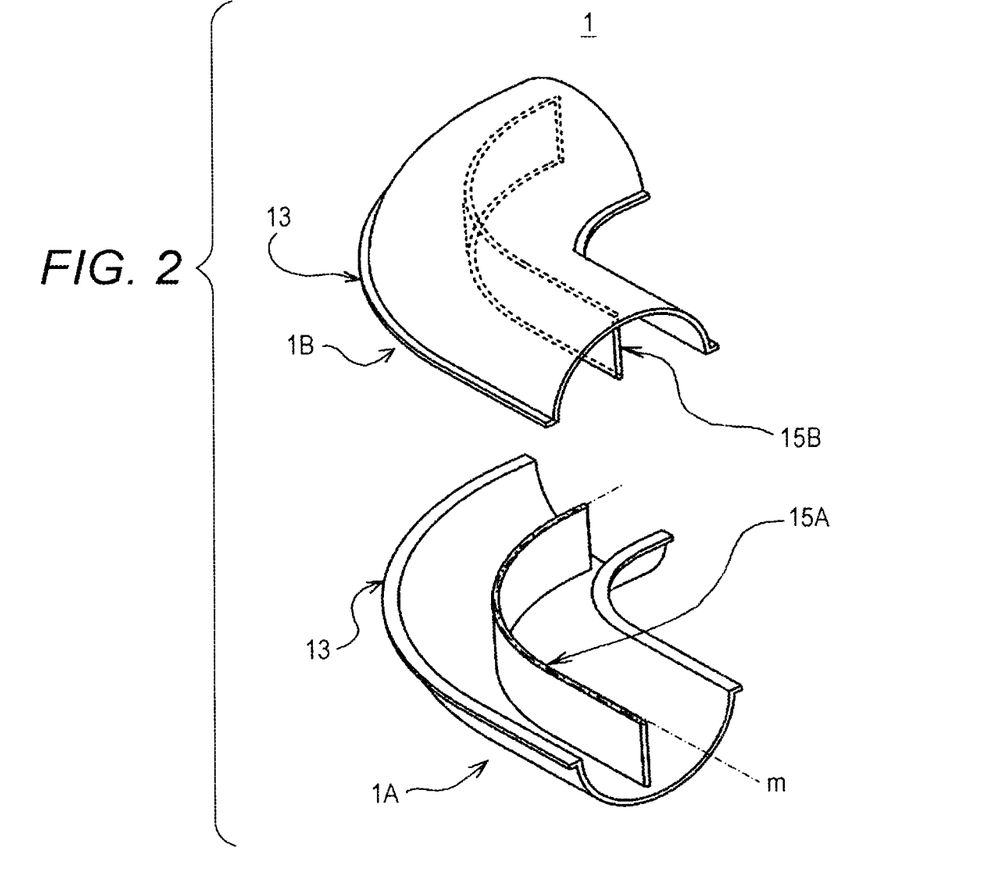
FIG. 2 is an exploded perspective view of a structure of the rectification structural body of the first embodiment.
Figure 3:
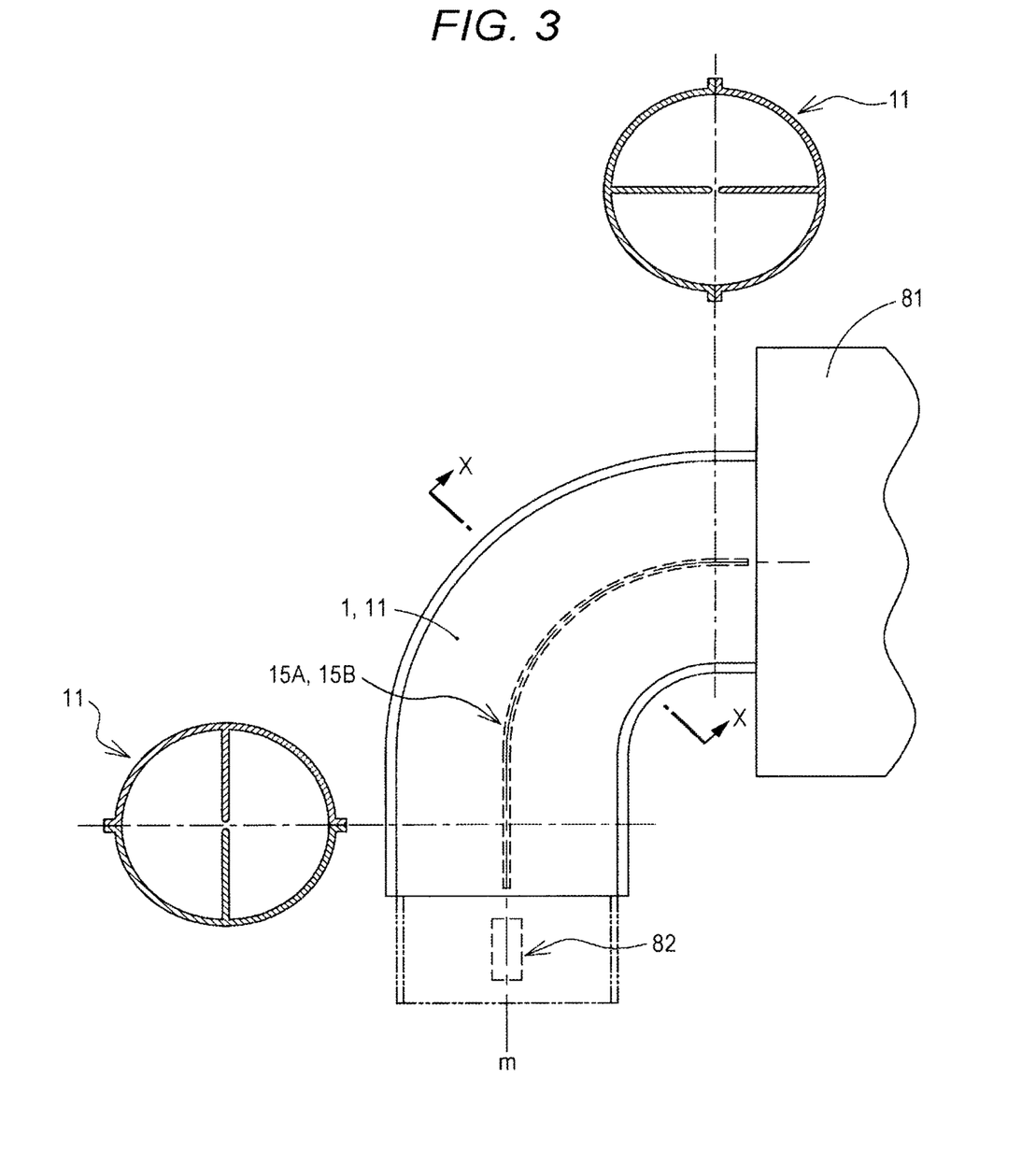
FIG. 3 is a plan view of the structure of the rectification structural body of the first embodiment.

FIG. 2 is an exploded perspective view of a structure of the rectification structural body 1 of the present embodiment. Moreover, FIG. 3 is a plan view of the structure of the rectification structural body 1 of the present embodiment. Further, FIG. 4 illustrates an X-X section of FIG. 3.

Figure 4:
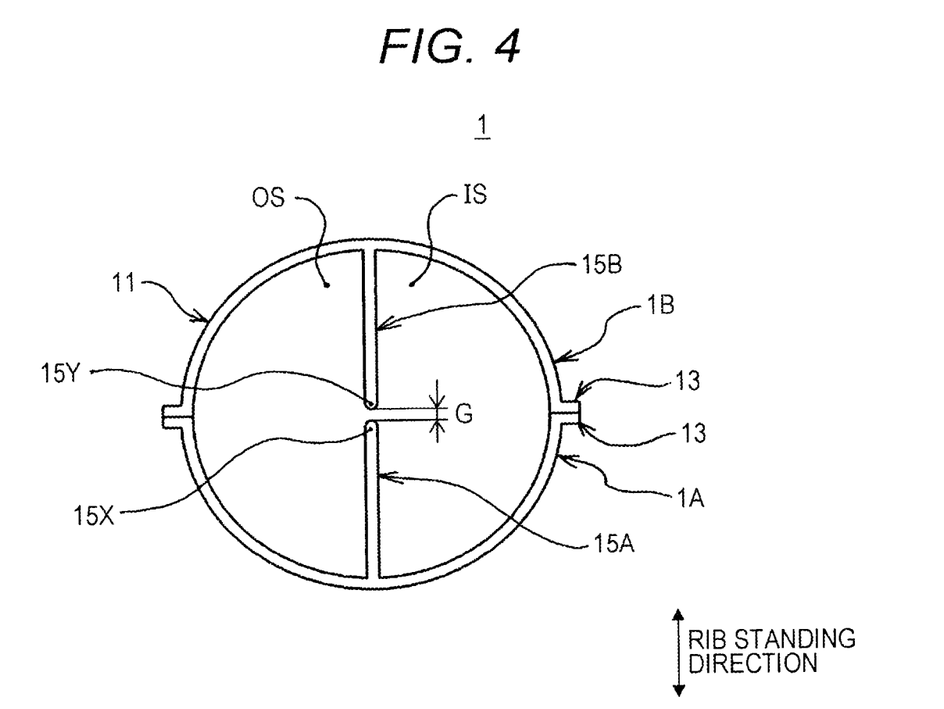
FIG. 4 is a sectional view of the structure of the rectification structural body of the first embodiment.

Note that for the sake of simplicity in illustration, hatching of a section is omitted in FIG. 4. The rectification structural body 1 has a pipe line 11 configured such that air flows from the air cleaner 81 to the airflow sensor 82. The pipe line 11 has a portion bent in an arc shape. The arc-shaped portion of the pipe line 11 causes air to flow in a bent shape.

In the rectification structural body 1, air flows in the bent shape by the arc-shaped bent portion of the pipe line 11. The form and degree of bending of the pipe line 11 is not specifically limited. Bending of the pipe line 11 may be bending in a C-shape or an L-shape, or may be such S-shaped bending that the flow meanders. Part of the pipe line 11 may be in a shape of a straight line. These forms are included in the arc-shaped bending form. Although not essential, air flowing into the pipe line 11 changes, in the present embodiment, the flow direction thereof in the arc shape by about 90 degrees as illustrated in FIG. 3, and then, flows out from the pipe line 11 to the airflow sensor 82. The angle of bending of the air flow is typically about 30 degrees to about 120 degrees.

The sectional shape (i.e., a sectional shape in a plane perpendicular to the center line m of the pipe line 11) of the pipe line 11 is not specifically limited. In the present embodiment, such a sectional shape of the pipe line 11 is a substantially circular shape. As in later-described other embodiments, the sectional shape of the pipe line 11 may be a rectangular shape. Alternatively, the sectional shape of the pipe line 11 may be other sectional shapes such as an oval shape and an ellipsoidal shape. Moreover, regarding the section of the pipe line 11, the sectional shape of the pipe line 11 and the sectional area of a flow path of the pipe line 11 may be constant across an extension direction of the center line m of the pipe line 11. Alternatively, the sectional shape of the pipe line 11 or the sectional area of the flow path may change across the center line of the pipe line 11.

An air guide plate (15A, 15B) is provided inside the pipe line 11. As illustrated in FIGS. 3 and 4, the air guide plate (15A, 15B) is provided to divide, in a radial direction of the arc of the pipe line 11, an internal space of the pipe line 11 into an inner portion IS and an outer portion OS of the arc. Moreover, the air guide plate (15A, 15B) is provided substantially parallel with the center line m of the pipe line 11. Here, the center line m of the pipe line 11 and the air guide plate (15A, 15B) are not necessarily fully parallel with each other. As long as a rectification effect along the center line of the pipe line 11 is obtained, the center line m of the pipe line 11 and the air guide plate (15A, 15B) may be inclined to each other to a certain extent. Further, the pipe line 11 (the air guide plate (15A, 15B)) may be configured such that the center line m of the pipe line 11 is included in the center plane of the air guide plate (15A, 15B), i.e., the internal space of the pipe line 11 is substantially divided in halves by the air guide plate (15A, 15B). Alternatively, the center line m of the pipe line 11 may be offset from the center plane of the air guide plate (15A, 15B). That is, the air guide plate (15A, 15B) may be configured such that either the inner portion IS or the outer portion OS is larger than the other one of the inner portion IS or the outer portion OS in the partitioned internal space.

Note that in an example described in the present embodiment, the single air guide plate (15A, 15B) is provided inside the pipe line 11. On this point, multiple air guide plates may be provided in the pipe line 11. For example, two air guide plates may be arranged at inner and outer periphery portions of the arc of the pipe line 11.

The air guide plate includes two ribs 15A, 15B. That is, two ribs 15A, 15B are assembled to form the single air guide plate. The ribs forming the air guide plate may be three or more. As illustrated in FIGS. 2 to 4, two ribs 15A, 15B stand in an arc shape in the pipe line 11. As viewed along a direction in which the ribs 15A, 15B stand (i.e., from a view of FIG. 3), the ribs 15A, 15B are provided in the arc shape to form the smoothly-curved air guide plate. Note that as long as the air flow is smoothly guided, the specific forms of the ribs 15A, 15B are not limited to the arc, and may be an arc-shaped form typified by, e.g., an oval, an ellipse, a combination of an arc and a line, and a curve with varying curvatures.

Further, as illustrated in the sectional view of the pipe line 11 of FIG. 4, two ribs 15A, 15B stand facing each other to extend toward each other. Although not essential, two ribs 15A, 15B are, as in the present embodiment, preferably substantially provided in a single continuous curved surface. That is, as viewed in the section of the pipe line 11 as in FIG. 4, the section of the first rib 15A and the section of the second rib 15B are preferably aligned with each other.

Figure 5A:
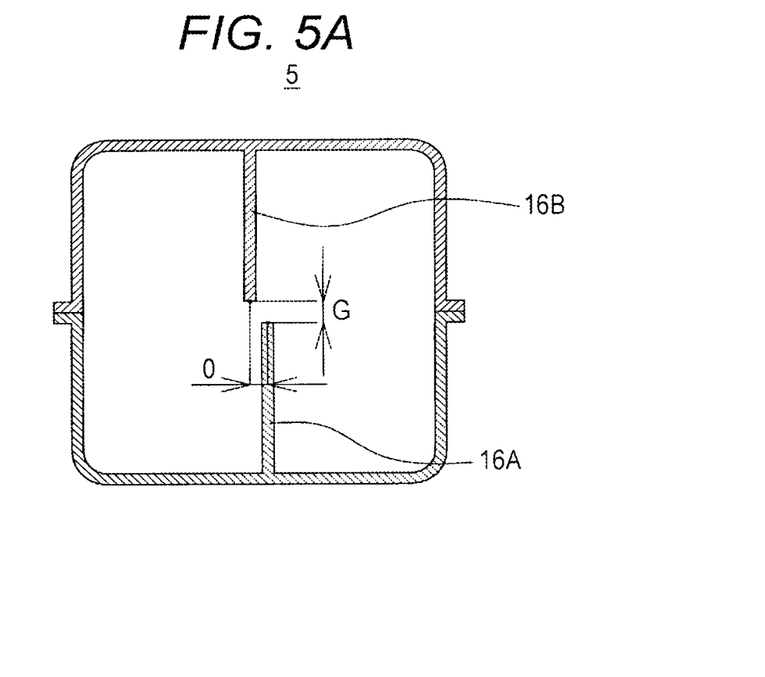
FIGS. 5A and 5B are sectional views of structures of rectification structural bodies of other embodiments.
Figure 5B:
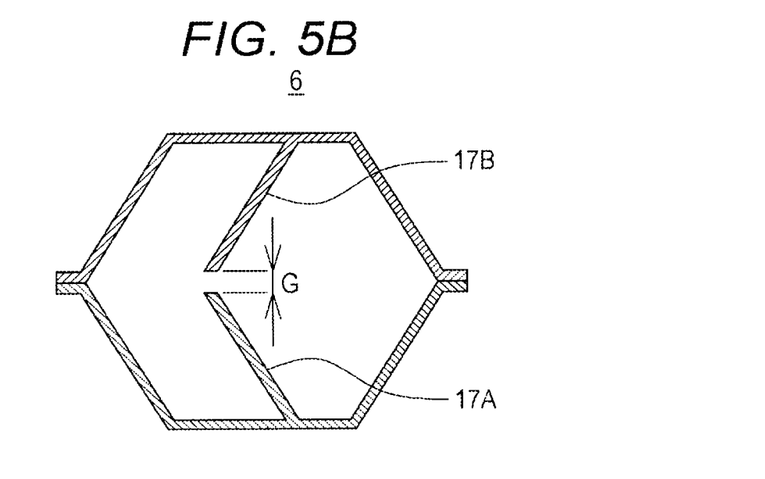

Note that as illustrated in FIG. 5A regarding a later-described second embodiment, two ribs 16A, 16B may be arranged offset from each other in a direction perpendicular to the plane of the rib (in a right-left direction of FIG. 5A). Alternatively, as illustrated in FIG. 5B regarding a later-described third embodiment, two ribs 17A, 17B may be configured such that the section of the first rib 17A and the section of the second rib 17B are arranged facing each other in a bent line shape as viewed in the section of the pipe line 11. Moreover, as described in these embodiments, the rib forming the air guide plate may be a solid plate-shaped rib. Alternatively, the rib forming the air guide plate may be a hollow rib as in ribs 72A, 72B illustrated in FIG. 6 regarding a later-described fourth embodiment.

As illustrated in FIG. 4, end edges 15X, 15Y of the ribs 15A, 15B are separated from each other in a rib standing direction by 0.5 to 5 mm at least on an airflow sensor side of the pipe line 11. Here, the rib standing direction is an upper-lower direction in FIG. 4. A separation distance is particularly preferably 1 to 4 mm. With separation of the end edges 15X, 15Y of the ribs 15A, 15B, a slit-shaped clearance G is provided at the air guide plate (15A, 15B). The inner portion IS and the outer portion OS of the internal space of the pipe line 11 divided by the air guide plate (15A, 15B) communicate with each other through the slit-shaped clearance G, and air can flow through the clearance G.

Although not essential, the end edges 15X, 15Y of two ribs 15A, 15B are, as in the present embodiment, preferably separated from each other across the entirety of the ribs along the center line of the pipe line 11. In the case of partially joining the end edges 15X, 15Y of two ribs 15A, 15B to form the ribs 15A, 15B as a single joined plate, the slit-shaped clearance G is provided between the end edges 15X, 15Y of the ribs at least on the airflow sensor side of the pipe line 11. The slit-shaped clearance G is, at the air guide plate, preferably provided across an area including a downstream ⅓ zone of an arc-shaped bent zone of the pipe line 11.

Although not essential, a spot (G) at which the end edges 15X, 15Y of two ribs are separated from each other is, as in the present embodiment, preferably positioned at a substantially center portion of the pipe line 11 in the section of the pipe line 11 perpendicular to the center line of the pipe line 11 as illustrated in FIG. 4.

Although not essential, the pipe line 11 preferably includes, as in the present embodiment, a first case 1A and a second case 1B integrated with each other. The first case 1A and the second case 1B have general shapes of the counterparts, to which the pipe line 11 could be divided in half. That is, the pipe line 11 includes the first case 1A and the second case 1B. Specifically, each of the first case 1A and the second case 1B is formed in a shape formed by dividing of the pipe line 11 in halves. In this case, one rib 15A of the ribs preferably stands in a substantially arc shape in the first case 1A, and the other rib 15B preferably stands in a substantially arc shape in the second case 1B.

Typically, as illustrated in FIG. 4, the first case 1A and second case 1B are each provided with flange-shaped joint portions 13. Using these joint portions 13, the first case 1A and the second case 1B are joined to each other by a method such as bonding and welding. In this manner, the pipe line 11 is configured (formed).

Note that the forms of the first case 1A and the second case 1B divided in halves may be such a division form that one of the first case 1A or the second case 1B is in an opening gutter-shaped form having a hat-shaped section and the other one of the first case 1A or the second case 1B is in the form of a plate-shaped lid.

In the present embodiment, the first case 1A and the second case 1B are integrated into the pipe line 11. A connection portion for connecting the pipe line 11 to upstream and downstream members (pipe lines) may be formed in advance at either the first case 1A or the second case 1B. Alternatively, as in the present embodiment, when the first case 1A and the second case 1B are integrated, the connection portion may be formed at a seam portion therebetween. Moreover, support portions, attachment portions, and the like are preferably integrated with these cases in advance.

A specific method for integrating the first case 1A and the second case 1B is not specifically limited. Typically, as described above, the first case 1A and the second case 1B are integrated by welding by means of the flange-shaped joint portions 13. Welding may be hot plate welding, vibration welding, or other welding methods. Alternatively, the first case 1A and the second case 1B may be integrated using an adhesive. Alternatively, the first case 1A and the second case 1B may be integrated using a fastening member such as a clip, a band, and a screw. Upon integration of the first case 1A and the second case 1B, such integration is preferably performed with airtightness of the pipe line 11 being held. Upon integration of the first case 1A and the second case 1B, a seal member may be provided therebetween. Note that as in the later-described other embodiments, the pipe line 11 of the rectification structural body 1 does not necessarily have airtightness.

Although not essential, a resonance-type silencer such as a Helmholtz resonator or a ¼ wavelength resonant tube may be provided in the pipe line 11. Moreover, although not essential, a sound-absorbing member may be provided with the sound-absorbing member being exposed at an inner surface of the pipe line 11.

In the rectification structural body 1, materials forming the first case 1A, the second case 1B, the first rib 15A, the second rib 15B, and the like are not specifically limited. These components may be made of, e.g., thermoplastic resin (specifically, e.g., polypropylene resin or polyamide resin). Moreover, manufacturing of the rectification structural body 1 can be performed utilizing a well-known manufacturing method. For example, by injection molding of thermoplastic resin, the first case 1A integrated with the first rib 15A and the second case 1B integrated with the second rib 15B can be formed. Further, the first case 1A and the second case 1B can be integrated by vibration welding, and in this manner, the rectification structural body 1 can be manufactured. As described later, the rectification structural body 1 may be also manufactured by other methods such as a blow molding method.

Features and advantageous effects of the rectification structural body 1 of the above-described embodiment will be described. According to the rectification structural body 1 of the above-described first embodiment, the output of the airflow sensor is stabilized across a wide range of flow rate. As a result, sensing performance is enhanced.

Figure 7:
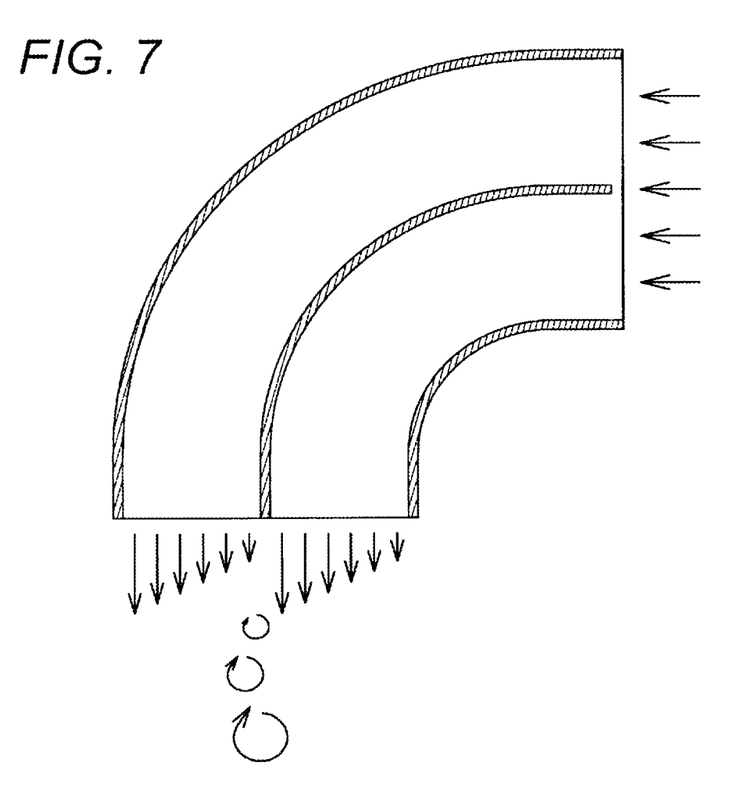
FIG. 7 is a schematic sectional view of outlet-side flow velocity distribution in a rectification structural body of a typical technique.

First, regarding a typical technique, a factor for unstable output of an airflow sensor when a flow rate increases will be described. In the typical technique, in the case of providing an air guide plate in a rectification structural body, a continuous air guide plate with no clearance and no slit is typically provided. In a state in which such a continuous air guide plate divides a flow path into an inner portion and an outer portion, air independently flows in the inner portion and the outer portion. Then, in a case where the flow path is bent, air flows to be diverted outward in a radial direction in each flow path. Thus, in the vicinity of an outlet of the flow path, flow velocity distribution is, as schematically illustrated in FIG. 7, caused in both of the inner portion (IS) and the outer portion (OS) of the flow path such that a flow velocity is high on a side corresponding to the outside of the bent portion in the radial direction and is low on a side corresponding to the inside of the bent portion in the radial direction. As a result, in the vicinity of an outlet of the rectification structural body, a difference in the flow velocity is great between air flows sandwiching the air guide plate. Moreover, at a downstream region without the air guide plate, these air flows with different flow velocities are joined together. Due to such a flow velocity difference, vortices are caused at a downstream portion of the air guide plate. As a result, flow disturbance is caused (FIG. 7).

The flow velocity difference at the rectification structural body outlet portion as illustrated in FIG. 7 causes the eddy and the disturbance on a downstream side. Such eddy and disturbance influence the output of the airflow sensor. Due to the disturbance in the air flow into the airflow sensor, the output of the airflow sensor becomes unstable. Even with the air guide plate, the output of the airflow sensor is unstable and the sensing performance is degraded if such air flow disturbance is caused. Specifically, when the flow rate in a pipe line increases, the flow velocity increases, and the flow velocity difference on the downstream side of the air guide plate increases accordingly. For this reason, great eddy and disturbance are easily caused.

On the other hand, in the rectification structural body 1 of the above-described embodiment, two ribs 15A, 15B provided in the rectification structural body 1 stand facing each other in the pipe line 11 to extend toward each other. The end edges 15X, 15Y of two ribs 15A, 15B are separated from each other in the rib standing direction by 0.5 to 5 mm at least on the airflow sensor side of the pipe line 11. Thus, such a separated slit-shaped clearance G allows air movement between the inner portion IS and the outer portion OS in the pipe line 11. By such air movement, a flow velocity difference across the air guide plate in the vicinity of an outlet of the rectification structural body 1 decreases. Thus, occurrence of an eddy and disturbance on a downstream side of the air guide plate is reduced. Consequently, according to the rectification structural body 1 of the above-described embodiment, the unstable output of the airflow sensor can be reduced. This enhances the sensing performance.

When the separation distance of the end edges 15X, 15Y of two ribs 15A, 15B is equal to or less than 0.1 mm, the clearance is small, and the air flow through the clearance is weak. Thus, it is difficult to obtain a sufficient effect of decreasing the flow velocity difference between the inside and outside of the air guide plate. Conversely, when the separation distance of the end edges 15X, 15Y of two ribs 15A, 15B is equal to or greater than 10 mm, action of the air guide plate for smoothly bending the flow is not sufficiently provided. In terms of obtaining the above-described effects, the separation distance of the end edges 15X, 15Y of two ribs 15A, 15B is particularly preferably equal to or greater than 1 mm and equal to or less than 4 mm.

Figure 8:
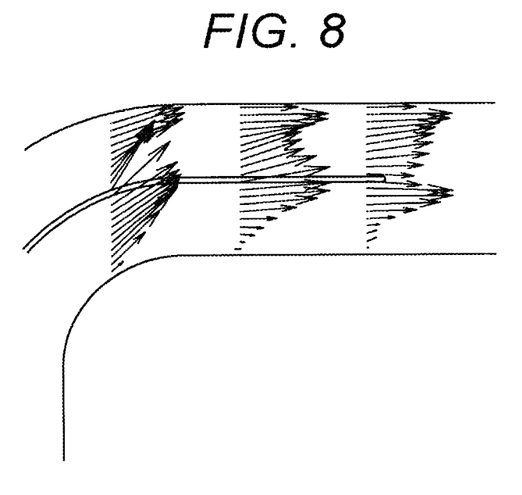
FIG. 8 illustrates flow velocity distribution obtained by air flow simulation in the rectification structural body of the first embodiment.
Figure 9:
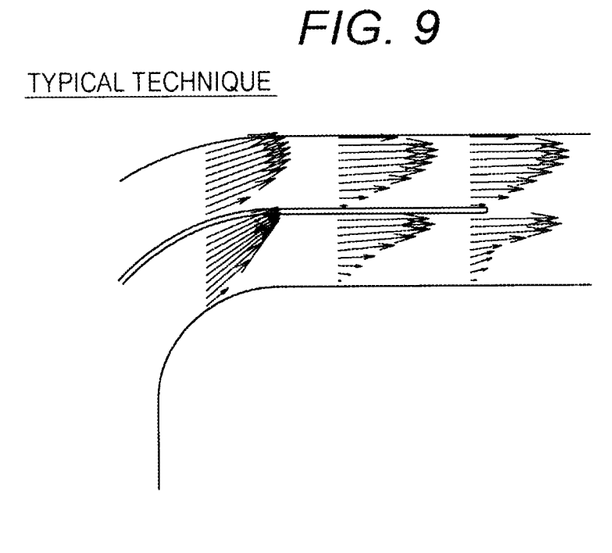
FIG. 9 illustrates flow velocity distribution obtained by air flow simulation in the rectification structural body of the typical technique.

The air flow from the air cleaner to the airflow sensor in the rectification structural body 1 was analyzed by numerical fluid dynamics simulation when the rectification structural body 1 of the above-described first embodiment is installed between the air cleaner 81 and the airflow sensor 82. FIG. 8 illustrates, as analysis results, flow velocity distribution in the rectification structural body 1 of the first embodiment. On the other hand, the flow from an air cleaner to the airflow sensor in the rectification structural body was analyzed by numerical fluid dynamics simulation when the rectification structural body, with a typical structure including no slit and no clearance (G) provided at the air guide plate, is installed between the air cleaner 81 and the airflow sensor 82. FIG. 9 illustrates, as analysis results, the flow velocity distribution in the typical technique.

In any simulation, calculation was performed for the following rectification structural body model. First, the diameter of the pipe line was 60 mm. Further, the pipe line was bent in an arc shape of 90° such that the curvature radius of the center line m of the pipe line is 75 mm. Moreover, a straight zone of 25 mm was provided on the upstream side, and a straight zone of 75 mm was provided on the downstream side. The air guide plate was provided across the entire length of the pipe line along the center line of the pipe line. Moreover, the clearance between the end edges 15X, 15Y of the ribs, i.e., the size of the slit-shaped clearance G, in the rectification structural body 1 of the first embodiment was 3 mm.

The numerical fluid dynamics simulation of the flow in each of the rectification structural body was performed under three conditions where an average flow velocity on an inlet side of the rectification structural body is 1 m/sec, 10 m/sec, or 30 m/sec. Moreover, in each simulation, a vorticity (/sec) was calculated in the section of the pipe line at a position 50 mm downstream from a downstream end of the air guide plate on an outlet side (the airflow sensor side) of the rectification structural body. Further, the average of the vorticity in a region having a diameter of 30 mm at a center portion of the pipe line was obtained. The average of the vorticity represents the magnitude of the flow disturbance on the downstream side of the rectification structural body.

FIG. 8 is a flow velocity distribution map showing the air flow simulation results of the rectification structural body 1 of the first embodiment. FIG. 9 is a flow velocity distribution map showing the air flow simulation results of the rectification structural body of the typical technique configured such that no slit and no clearance are provided at the air guide plate. Note that in these maps of the flow, the results in the section along the center line m of the pipe line are shown, and the length of an arrow indicates the magnitude of the flow velocity. Air flows from the lower side of the figure, and flows out to the right side of the figure. Any figure shows the simulation results at a pipe line inlet-side average flow velocity of 1 m/sec.

Regarding the inner and outer portions of the air guide plate of the rectification structural body in the typical technique of FIG. 9, a phenomenon (a phenomenon that a flow velocity gradient is caused) that the flow velocity is higher on the outside of the bent portion than on the inner side is prominent. As a result, observed is a state where the flow velocity difference is great at positions sandwiching the air guide plate at the outlet portion of the rectification structural body.

On the other hand, in the rectification structural body 1 of the first embodiment of FIG. 8, air can flow from the inside to the outside of the air guide plate through the slit-shaped clearance provided at the air guide plate. With this configuration, the flow velocity difference between the inside and outside of the air guide plate is small at the positions sandwiching the air guide plate. Thus, occurrence of the eddy and the disturbance on the downstream side of the air guide plate is reduced.

Figure 10:
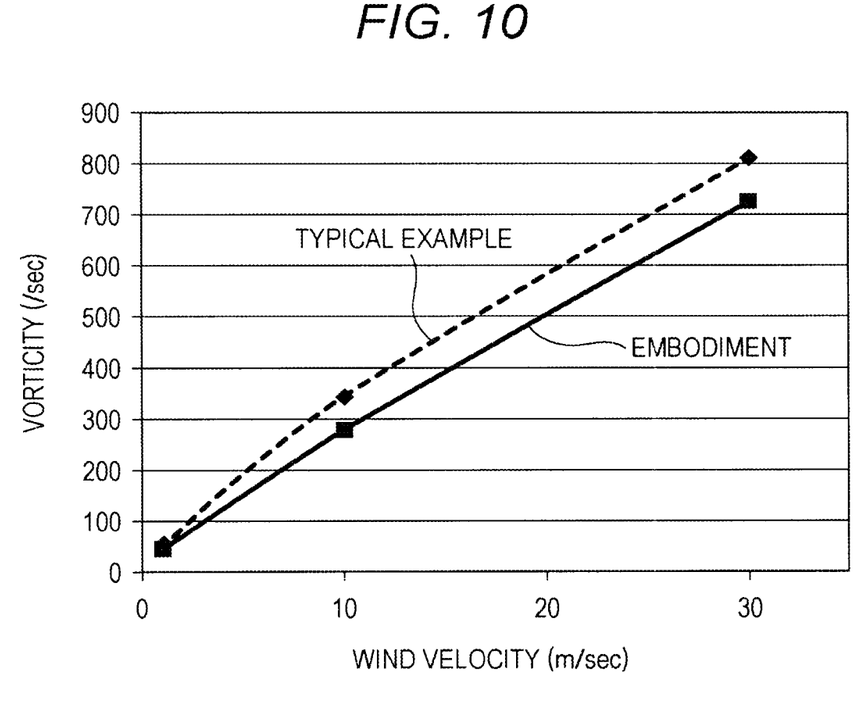
FIG. 10 is a graph showing a relationship between flow velocity fluctuation and the magnitude of flow disturbance at rectification structural body outlet-side calculated by the air flow simulation.

FIG. 10 is a graph showing a relationship between the magnitude of the rectification structural body outlet-side flow disturbance obtained by air flow simulation calculation and flow velocity variation. For each flow velocity, the vorticity average (/sec) in the region having a diameter of 30 mm at the center portion of the pipe line at the position 50 mm downstream from the downstream end of the air guide plate is shown. A solid line indicates calculation results regarding the rectification structural body 1 (EMBODIMENT) of the first embodiment, and a dashed line indicates calculation results regarding the rectification structural body (TYPICAL EXAMPLE) of the typical technique. The vorticity calculation results at flow velocities of 1, 10, and 30 m/sec are each 46, 279, and 725 (/sec) in the rectification structural body 1 of the first embodiment, and are each 55, 345, and 812 (/sec) in the rectification structural body of the typical technique. In the rectification structural body 1 of the first embodiment, it can be confirmed that occurrence of the eddy and the disturbance is, as compared to the typical technique, reduced by slightly over 10 percent to slightly under 20 percent across a broad flow rate range in the pipe line center portion region where the slit-shaped clearance G is provided at the air guide plate.

Figure 11:
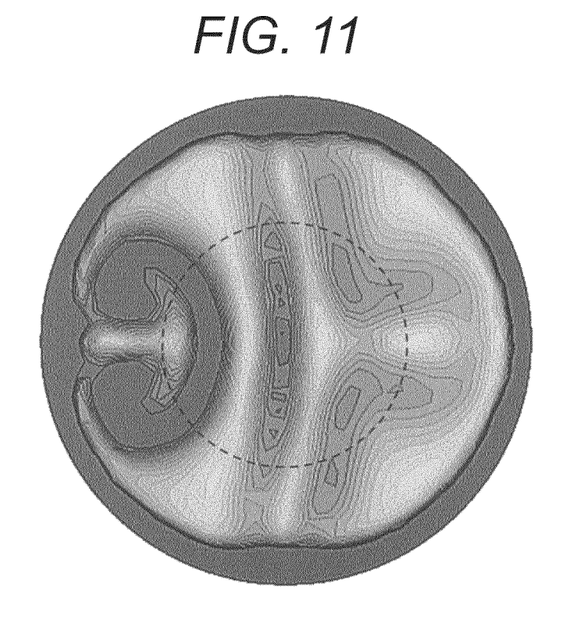
FIG. 11 illustrates vorticity distribution obtained by the air flow simulation in the rectification structural body of the first embodiment.
Figure 12:
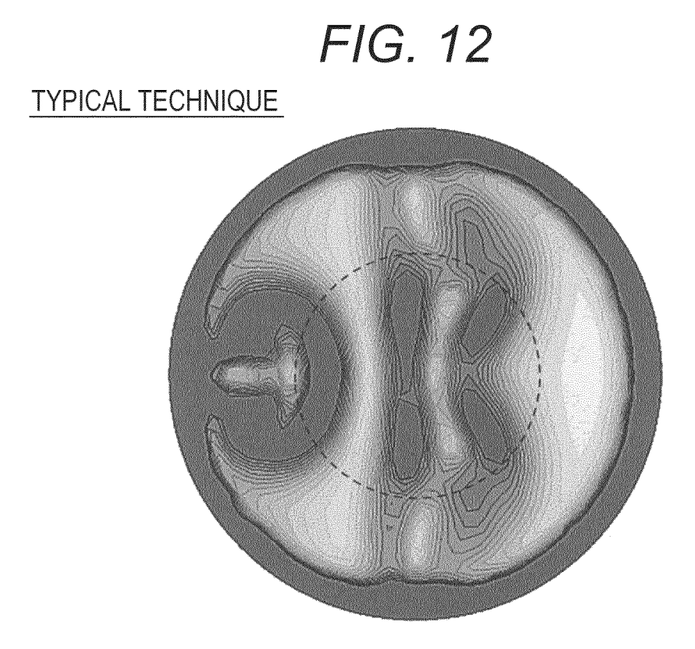
FIG. 12 illustrates vorticity distribution obtained by the air flow simulation in the rectification structural body of the typical technique.

FIGS. 11 and 12 illustrate distribution of the vorticity in the pipe line, the vorticity being obtained by the air flow simulation calculation. Any figure shows calculation results at the position 50 mm downstream from the downstream end of the air guide plate at a flow velocity of 10 m/sec. In these figures, a darker portion indicates a higher vorticity. Both figures are colored according to the same vorticity scale. FIG. 11 is the vorticity distribution regarding the rectification structural body 1 of the first embodiment. FIG. 12 is the vorticity distribution regarding the rectification structural body of the typical technique. A dashed circle in the figure indicates a circular region having a diameter of 30 mm at the center of the pipe line, the circular region being targeted for calculation of the average of the vorticity. According to the vorticity distribution regarding the rectification structural body of the typical technique as illustrated in FIG. 12, it is shown that a region with a high vorticity prominently appears at the center portion of the pipe line. On the other hand, according to the vorticity distribution regarding the rectification structural body 1 of the first embodiment as illustrated in FIG. 11, it is shown that the region with the high vorticity is narrowed.

As described above, according to the rectification structural body 1 of the above-described first embodiment, occurrence of the air flow disturbance (the eddy) on the downstream side of the rectification structural body 1 can be reduced. Thus, the output of the airflow sensor is stabilized and the sensing performance is enhanced across a wide flow rate range.

Although not essential, in a case where two ribs 15A, 15B are substantially provided in a single continuous curved surface as in the rectification structural body 1 of the above-described first embodiment, a step is less caused at the air guide plate formed by two ribs 15A, 15B. Thus, the rectification effect is enhanced, and the output of the airflow sensor is more stabilized. As a result, the sensing performance is enhanced.

Moreover, although not essential, in a case where the end edges 15X, 15Y of two ribs are separated from each other across the entirety of the ribs along the center line m of the pipe line 11 as in the present embodiment, the rectification structural body 1 is easily manufactured by assembly of two cases 1A, 1B divided in halves. Thus, a rectification structural body with a high rectification effect is easily efficiently manufactured. In this case, the size of the clearance G between the ribs 15A, 15B may be constant across the flow direction in the pipe line 11. Alternatively, the ribs 15A, 15B may be configured such that the clearance G monotonically increases from the upstream side to the downstream side.

Although not essential, the spot at which the end edges 15X, 15Y of two ribs are separated from each other is, as in the rectification structural body 1 of the above-described first embodiment, preferably positioned at the substantially center portion in the section of the pipe line 11 in the plane perpendicular to the center line m of the pipe line 11. With this configuration, the output of the airflow sensor is specifically stabilized, and the sensing performance is enhanced. A reason is as follows. That is, as seen from an eddy-causing situation in the rectification structural body of the typical technique as illustrated in FIG. 12, the high-vorticity portion is easily caused at the center portion of the section of the pipe line on the downstream side of the bent pipe line provided with the air guide plate. The flow velocity difference at such a portion is decreased so that occurrence of the eddy and the disturbance can be effectively reduced.

Moreover, although not essential, the pipe line 11 is preferably configured such that the first case 1A and the second case 1B are integrated, one of the ribs preferably stands in the substantially arc shape in the first case 1A, and the other rib preferably stands in the substantially arc shape in the second case. According to such a configuration, two cases 1A, 1B can be manufactured by injection molding, and both cases can be integrated by, e.g., welding. With this configuration, the rectification structural body 1 of the first embodiment can be efficiently manufactured.

The aspect of the present disclosure is not limited to that of the above-described embodiment, and various modifications can be made. Hereinafter, other embodiments of the present disclosure will be described. In description below, differences from the above-described embodiment will be mainly described, and detailed description of similar contents will be omitted. Moreover, these embodiments can be implemented with some of these embodiments being combined together or being replaced.

FIGS. 5A and 5B illustrate rectification structural bodies of the other embodiments. The rectification structural bodies of the other embodiments illustrated in FIGS. 5A and 5B are different from the rectification structural body 1 of the first embodiment in a pipe line sectional shape and structure and arrangement of an air guide plate (a rib), and on the other points, are similar to the rectification structural body 1 of the first embodiment. FIGS. 5A and 5B illustrate an X-X section corresponding to FIG. 4 of the first embodiment.

FIG. 5A illustrates a rectification structural body 5 of a second embodiment. In the rectification structural body 5, the first rib 16A is provided offset from the second rib 16B in a direction perpendicular to the plane of the rib (a right-left direction of FIG. 5A). The rectification structural body 5 is similar to the rectification structural body 1 of the first embodiment in that end edges of two ribs 16A, 16B are separated from each other in a rib standing direction (an upper-lower direction of FIG. 5A) by a predetermined distance and the separation portion is a clearance G. An offset amount O of the first rib 16A from the second rib 16B is preferably smaller than the clearance G with which the end edges of the ribs 16A, 16B are separated from each other in the rib standing direction. Moreover, in the rectification structural body 5 of the second embodiment, the pipe line sectional shape is a rectangular shape.

FIG. 5B illustrates a rectification structural body 6 of a third embodiment. In the rectification structural body 6, the first rib 17A and the second rib 17B are provided inclined to each other such that the sections of the ribs form a bent line shape as viewed in the section. Moreover, in the rectification structural body 6 of the third embodiment, a pipe line sectional shape is a hexagonal shape.

Not only in the rectification structural body 5 of the second embodiment, but also in the rectification structural body 6 of the third embodiment, the clearance G with which the end edges of two ribs 16A, 16B (17A, 17B) forming the air guide plate are separated from each other in the rib standing direction by 0.5 to 5 mm is provided between these end edges at least on an airflow sensor side of the pipe line as in the rectification structural body 1 of the first embodiment. Thus, the clearance G reduces a flow velocity difference between the inside and outside of the air guide plate. Consequently, occurrence of an eddy and disturbance on a downstream side of the air guide plate can be reduced. With this configuration, the output of an airflow sensor can be stabilized. As a result, sensing performance can be enhanced.

Figure 6:
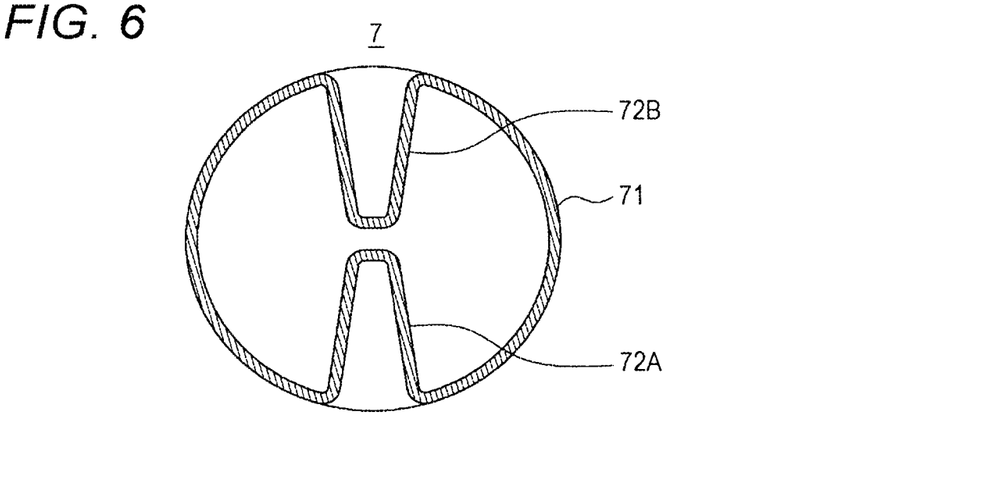
FIG. 6 is a sectional view of a structure of a rectification structural body of another embodiment.

FIG. 6 illustrates a rectification structural body 7 of a fourth embodiment. In the rectification structural body 7, a pipe line 71, the hollow first rib 72A, and the hollow second rib 72B are integrally molded by blow molding. The rectification structural body 7 is broadly similar to the rectification structural body 1 of the first embodiment on the other points. Similarly, in the rectification structural body 7, the output of an airflow sensor can be also stabilized, and therefore, sensing performance can be enhanced.

Figure 13:
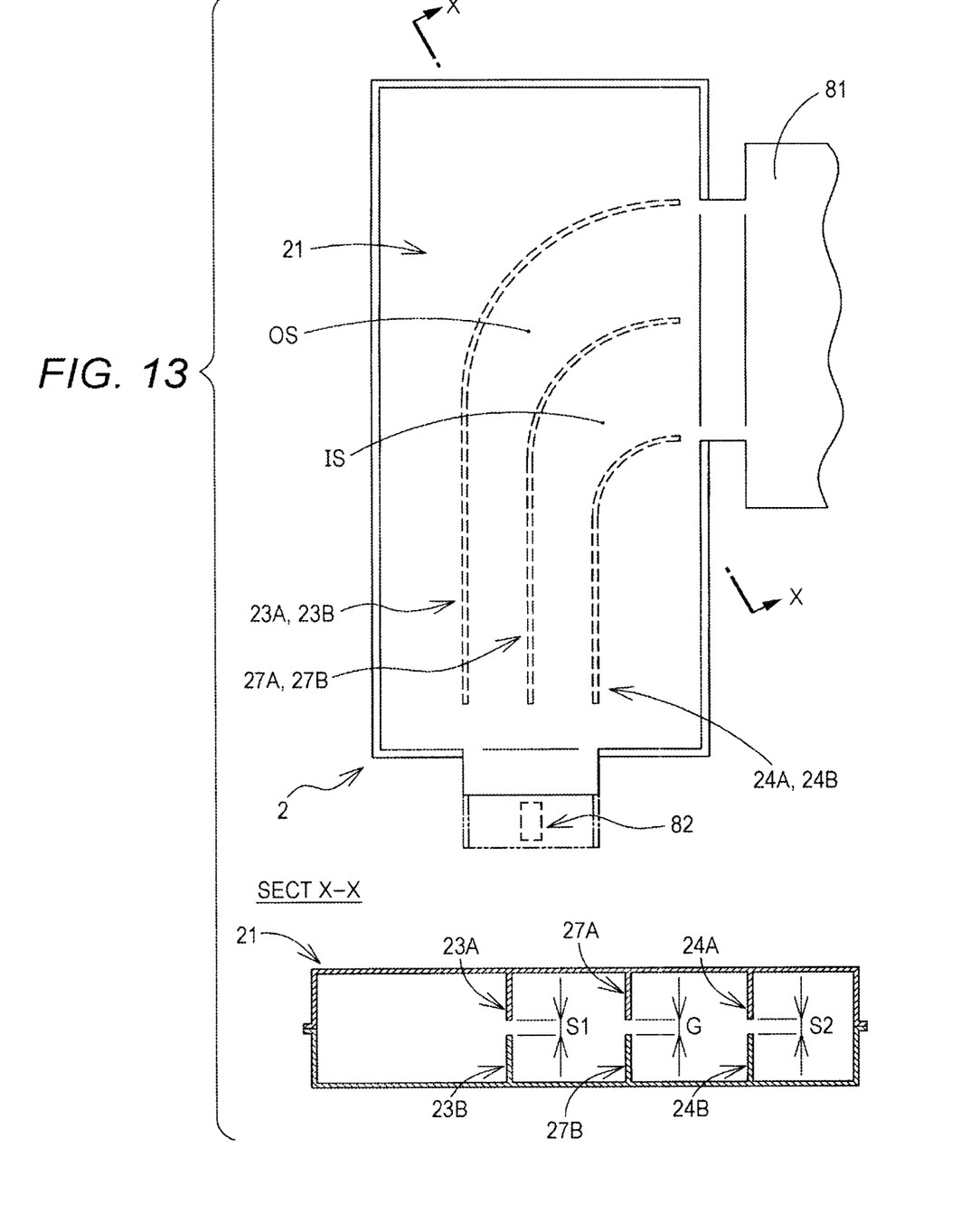
FIG. 13 is plan and sectional views of a structure of a rectification structural body of still another embodiment.

FIG. 13 illustrates a rectification structural body 2 of a fifth embodiment. The rectification structural body 2 has an enlarged chamber (a chamber) 21 with an expanded internal volume. In the rectification structural body 2, a pipe line is defined and formed inside the enlarged chamber 21. That is, in the enlarged chamber, outer peripheral pipe line walls 23A, 23B and inner peripheral pipe line walls 24A, 24B stand in an arc shape. A portion surrounded by the outer peripheral pipe line walls 23A, 23B and the inner peripheral pipe line walls 24A, 24B is connected to the inlet and outlet of the enlarged chamber 21. Such a portion substantially forms the pipe line, causes air flow from an air cleaner 81 to bend in an arc shape, and guides such air to an airflow sensor 82.

In the present embodiment, an air guide plate (27A, 27B) dividing an internal space of the pipe line into an inner portion IS and an outer portion OS of the arc is also provided substantially parallel with the center line of the pipe line. In the present embodiment, the air guide plate also includes two ribs 27A, 27B. Two ribs 27A, 27B stand in an arc shape to face each other and extend toward each other. End edges of two ribs 27A, 27B are separated from each other in a rib standing direction by 0.5 to 5 mm, and therefore, a slit-shaped clearance G is provided. With this configuration, the clearance G as the separated portion of the air guide plate (27A, 27B) also reduces, as in the other embodiments, a flow velocity difference between the inside and outside of the air guide plate in the present embodiment. This can reduce occurrence of an eddy and disturbance on a downstream side of the air guide plate. As a result, the output of the airflow sensor can be stabilized, and therefore, sensing performance can be enhanced.

Note that in the present embodiment, an outer peripheral pipe line wall and an inner peripheral pipe line wall are each formed by groups of two arc-shaped ribs 23A, 23B (24A, 24B). The ribs forming these rib groups stand facing each other to extend toward each other. In these groups of the ribs 23A, 23B (24A, 24B), the end edges of the ribs may be integrally connected to each other. Alternatively, as in the present embodiment, a clearance S1 (S2) with a predetermined spacing may be provided between the end edges of the ribs. That is, a clearance or a portion having air permeability may be provided at part of the pipe line wall of the pipe line in the rectification structural body.

Figure 14:
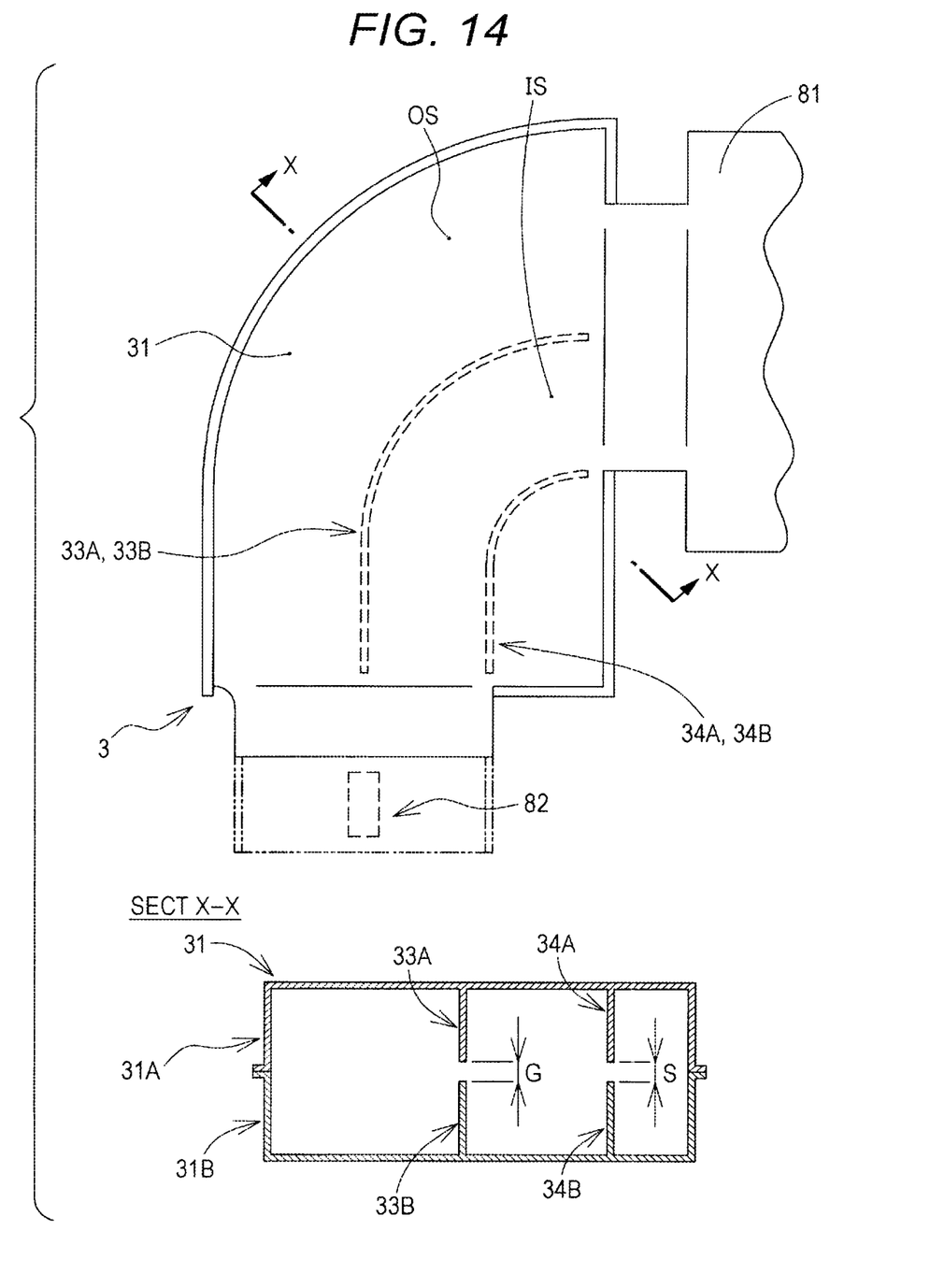
FIG. 14 is plan and sectional views of a structure of a rectification structural body of still another embodiment.

FIG. 14 illustrates a rectification structural body 3 of a sixth embodiment. The rectification structural body 3 also has an enlarged chamber (a chamber) 31 having an expanded volume. In the rectification structural body 3, a pipe line is formed inside outer peripheral wall surfaces 31A, 31B and inner peripheral pipe line walls 34A, 34B in the enlarged chamber. An air guide plate (33A, 33B) dividing an internal space of the pipe line into an inner portion IS and an outer portion OS of the arc is provided substantially parallel with the center line of the pipe line.

In the present embodiment, the air guide plate also includes two ribs 33A, 33B. Two ribs stand in an arc shape to face each other and extend toward each other. End edges of two ribs 33A, 33B are separated from each other in a rib standing direction by 0.5 to 5 mm, and therefore, a slit-shaped clearance G is provided. As in the other embodiments, a configuration including the air guide plate 33A, 33B having such a clearance G reduces a flow velocity difference between the inside and outside of the air guide plate. Thus, occurrence of an eddy and disturbance on a downstream side of the air guide plate can be reduced. As a result, the output of an airflow sensor can be stabilized, and therefore, sensing performance can be enhanced. That is, as in the present embodiment, the pipe line of the rectification structural body may be formed by a combination of so-called chamber walls (31A, 31B) and the inner peripheral pipe line walls 34A, 34B partitioning the inside of the chamber.

Moreover, as in the present embodiment, a clearance S with a predetermined width may be provided between the end edges of two ribs 34A, 34B forming the pipe line walls. A clearance or a portion having air permeability may be provided at part of the pipe line wall in the pipe line.

In description of the above-described embodiments, description of a detailed structure, e.g., description of a specific attachment structure provided at the rectification structural body has been omitted. As necessary, the rectification structural body can include an attachment structure such as a stay or a grommet. Moreover, for, e.g., a connection structure between the rectification structural body and the air cleaner and a connection structure between the rectification structural body and the pipe body to which the airflow sensor is attached, detailed description has been omitted. As necessary, the rectification structural body can include, at these connection portions, a fixing structure such as a seal material or a fixing band.

Moreover, in description of the rectification structural bodies of the above-described embodiments, the example where the rectification structural body is provided separately from the air cleaner has been mainly described. On this point, the rectification structural body may be integrated with the air cleaner.

Further, the rectification structural bodies according to the present embodiments may be the following first rectification structural body.

The first rectification structural body is a rectification structural body provided between an air cleaner and an airflow sensor in an intake system of an internal combustion engine. The rectification structural body includes a pipe line configured such that air flows from the air cleaner to the airflow sensor. The pipe line has a portion bent in an arc shape. In the pipe line, an air guide plate dividing an internal space of the pipe line into an inner portion and an outer portion of the arc is provided substantially parallel with the center line of the pipe line. The air guide plate includes two ribs. Two ribs are each in an arc shape. Two ribs stand, inside the pipe line, facing each other to extend toward each other. End edges of two ribs are separated from each other in a rib standing direction by 0.5 to 5 mm at least on an airflow sensor side of the pipe line.

The rectification structural body of the present embodiments can be used for the intake system of the internal combustion engine. The rectification structural body of the present embodiments can rectify the air flow toward the airflow sensor, and has a great deal of potential in industry.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A rectification structural body provided between an air cleaner and an airflow sensor in an intake system of an internal combustion engine, the rectification structural body comprising a pipe line configured such that air flows from the air cleaner to the airflow sensor, wherein
   the pipe line includes a portion bent in an arc shape,
   in the pipe line, an air guide plate is provided substantially parallel with a center line of the pipe line,
   the air guide plate divides an internal space of the pipe line into an inner portion and an outer portion of the arc,
   the air guide plate includes two ribs,
   the two ribs are each in an arc shape,
   the two ribs stand, inside the pipe line, facing each other to extend toward each other, and
   end edges of the two ribs are separated from each other in a rib standing direction by 0.5 to 5 mm at least on an airflow sensor side of the pipe line.

2. The rectification structural body according to claim 1, wherein
   the two ribs are substantially provided in a single continuous curved surface.

3. The rectification structural body according to claim 1, wherein
   the end edges of the two ribs are separated from each other across an entirety of the ribs along the center line of the pipe line.

4. The rectification structural body according to claim 2, wherein
   the end edges of the two ribs are separated from each other across an entire of the ribs along the center line of the pipe line.

5. The rectification structural body according to claim 1, wherein
   a spot at which the end edges of the two ribs are separated from each other is positioned at a substantially center portion in a section of the pipe line perpendicular to the center line of the pipe line.

6. The rectification structural body according to claim 2, wherein
   a spot at which the end edges of the two ribs are separated from each other is positioned at a substantially center portion in a section of the pipe line perpendicular to the center line of the pipe line.

7. The rectification structural body according to claim 3, wherein
   a spot at which the end edges of the two ribs are separated from each other is positioned at a substantially center portion in a section of the pipe line perpendicular to the center line of the pipe line.

8. The rectification structural body according to claim 4, wherein
   a spot at which the end edges of the two ribs are separated from each other is positioned at a substantially center portion in a section of the pipe line perpendicular to the center line of the pipe line.

9. The rectification structural body according to claim 3, wherein
- the pipe line includes a first case and a second case integrated with each other,
- in the first case, one of the ribs stands in a substantially arc shape, and
- in the second case, the other rib stands in a substantially arc shape.

10. The rectification structural body according to claim 4, wherein
- the pipe line includes a first case and a second case integrated with each other,
- in the first case, one of the ribs stands in a substantially arc shape, and
- in the second case, the other rib stands in a substantially arc shape.

* * * * *

UNITED STATES PATENT AND TRADEMARK OFFICE
CERTIFICATE OF CORRECTION

PATENT NO. : 11,008,986 B2
APPLICATION NO. : 16/806360
DATED : May 18, 2021
INVENTOR(S) : Shunsuke Sakata Page 1 of 1

It is certified that error appears in the above-identified patent and that said Letters Patent is hereby corrected as shown below:

In the Specification

Column 3, Line 29, "each other extend toward" should read -- each other to extend toward --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*